US00RE36965E

United States Patent [19]

Salvemini

[11] E Patent Number: Re. 36,965

[45] Reissued Date of Patent: Nov. 21, 2000

[54] SELF-PROPELLED RESCUE APPARATUS

[75] Inventor: Marcus Salvemini, La Jolla, Calif.

[73] Assignee: Rescue Solutions International, San Diego, Calif.

[21] Appl. No.: 09/213,631

[22] Filed: Dec. 17, 1998

Related U.S. Patent Documents

Reissue of:

[64] Patent No.: 5,584,736
Issued: Dec. 17, 1996
Appl. No.: 08/523,949
Filed: Sep. 6, 1995

[51] Int. Cl.[7] ..... B63C 9/26

[52] U.S. Cl. ..... 441/85

[58] Field of Search ..... 441/1, 6, 13, 17, 441/81, 84, 85, 88, 95, 97, 100, 101, 108, 113; 42/1.14, 1.15, 71.01, 72, 74, 90, 94; 89/36.06, 36.05, 1.34, 37.04; 102/504

[56] References Cited

U.S. PATENT DOCUMENTS

| | | | |
|---|---|---|---|
| 1,154,860 | 9/1915 | Hendry | 441/111 |
| 1,341,529 | 5/1920 | Watts | 441/108 |
| 2,457,755 | 12/1948 | Ugazio et al. | 89/36.06 |
| 2,496,479 | 2/1950 | Kochner et al. . | |
| 2,581,758 | 1/1952 | Galliano et al. | 124/75 |
| 2,765,481 | 10/1956 | Manhart et al. . | |
| 3,077,618 | 2/1963 | O'Link | 441/113 |
| 3,183,530 | 5/1965 | Girden | 441/65 |
| 3,221,932 | 12/1965 | Anderson | 222/5 |
| 3,496,580 | 2/1970 | Gulmon et al. . | |
| 3,775,782 | 12/1973 | Rice et al. | 5/625 |
| 3,886,612 | 6/1975 | Schnirel et al. . | |
| 4,155,132 | 5/1979 | Lee . | |
| 4,305,143 | 12/1981 | Simms et al. . | |
| 4,313,236 | 2/1982 | Tupper et al. . | |
| 4,332,234 | 6/1982 | Allen . | |
| 4,343,056 | 8/1982 | McDonald . | |
| 4,380,441 | 4/1983 | Harr et al. . | |
| 4,505,179 | 3/1985 | Nelson et al. . | |
| 4,599,073 | 7/1986 | Fryer et al. . | |
| 4,713,033 | 12/1987 | Cameron . | |
| 4,799,906 | 1/1989 | Perkins, Jr. . | |
| 4,836,815 | 6/1989 | Spurgeon . | |
| 5,022,879 | 6/1991 | Diforte . | |
| 5,348,504 | 9/1994 | Pierce et al. . | |
| 5,409,187 | 4/1995 | Dunham . | |

FOREIGN PATENT DOCUMENTS

| | | |
|---|---|---|
| 77 15460 | 12/1978 | France . |
| 901160 | 1/1982 | U.S.S.R. . |
| PCT/NO81/ 00018 | 5/1981 | WIPO . |

OTHER PUBLICATIONS

Advertisement, Rescue Magazine, Jan./Feb. 1996.
Brochure, A.I.R. (Air Initiated Rescue), Undated.

*Primary Examiner*—Stephen Avila
*Attorney, Agent, or Firm*—Peter K. Hahn; Luce, Forward, Hamilton & Scripps LLP

[57] ABSTRACT

Rescue apparatus comprising a self-propelled missile mounted on a hand-held launcher and arranged to carry a flotation device in a collapsed condition from the launcher to a distressed target, the launcher and flotation device being connected by a flexible line, so that when the missile is aimed and launched toward the target, the flotation device is carried to the target and then deployed automatically to provide flotation support and establish a "life-line" from the launcher.

31 Claims, 3 Drawing Sheets

SELF-PROPELLED RESCUE APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to rescue apparatus and, more particularly, to a self-propelled rescue apparatus for deploying a "life-line" and life-support item to a distressed target located a substantial distance from the launching site.

2. Description of Prior Art

It has long been a problem when attempting to rescue people, especially a person who has fallen overboard from a boat, to be able to launch a line from the rescuer to the person in distress. This problem has been especially evident when the rescue apparatus, in its simplest form, involved hand throwing a life line or other rescue device to the person in distress. Clearly, such apparatus inherently depends on the strength and skill of the rescuer and, at best, suffers from a severe distance limitation. Even more advanced apparatus which rely upon firing a projectile comprising life saving devices have had their limitations as to the distances the rescue device can be projected and because of safety factors involved with the launching platforms used for firing the projectiles.

In the field of mechanized rescue apparatus, it has been the general practice to employ projectiles, with attached life-lines which are fired in the direction of the distressed person. The projectiles historically have relied upon launching devices, such as modified rifles, grenade launchers and harpoon launchers. Although such devices have been useful, they have not proven to be entirely satisfactory under all conditions, generally having been designed for large commercial or military vessels (as evidenced by one system that uses a fuel driven propulsion rocket motor as a thrust source). Additionally, they do not lend themselves to general public use due to the inherently dangerous environment associated with the launching devices which employ gun powder, volatile fuel, or similar charges to propel the life saving projectile. They are also limited in terms of the distance that a projectile can be fired from a launcher.

It will be appreciated then, that there exists a need for a simple means of launching rescue devices to distressed people in life threatening situations at great distances from the rescuer, while at the same time providing a safe launching platform, free from dangerous fuels, explosives, or other firing mechanisms. Moreover, it is desirable to do so with relatively low cost apparatus that comprises all reusable parts which dramatically reduces on going operational costs.

SUMMARY OF THE INVENTION

Briefly, and in general terms, the present invention provides a safe, reliable rescue apparatus for deploying a life-line with a life-support item at one end to a distressed target at a substantial distance from a rescuer. This is accomplished by apparatus that incorporates a self-propelled missile which is releasably mounted on a launcher connected to the other end of the life-line and which, upon activation, carries the life-support item and life-line from the launcher to the location of the distressed target.

In a more detailed aspect of the invention, the launcher is adapted to be hand-held and the missile includes a cartridge of pressurized gas that serves as the missile propellant. Mounted on the missile is a container that releasably contains the life-support item adapted to be released automatically at the location of the target. For economic and convenience reasons, the gas cartridge preferably is rechargeable.

In a preferred embodiment of the invention, the rescue apparatus is especially adapted for rescue of a person in distress in the water. The life-support item then constitutes a flotation device that is carried initially within the container on the missile in a collapsed condition. Upon water contact, the flotation device is deployed from the container and expanded for supporting the distressed person and enabling rescue by retrieval of the life-line. To aid in the rescue process, a beacon is also carried by the missile and arranged to be illuminated upon contact with the water.

These and other features and advantages of the invention will appear in the following detailed description of the preferred embodiment, read in conjunction with the accompanying drawings.

DETAILED DESCRIPTION OF THE PREFERRED EMBODIMENTS

Figure 1:
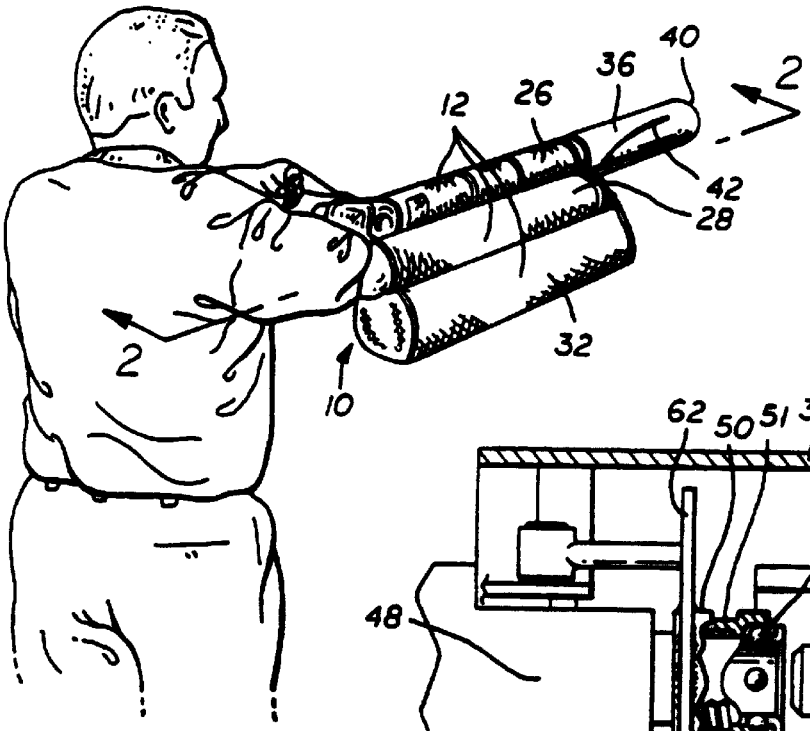
FIG. 1 is a perspective view of rescue apparatus embodying the invention in a condition in which it is ready to be utilized.
Figure 4:
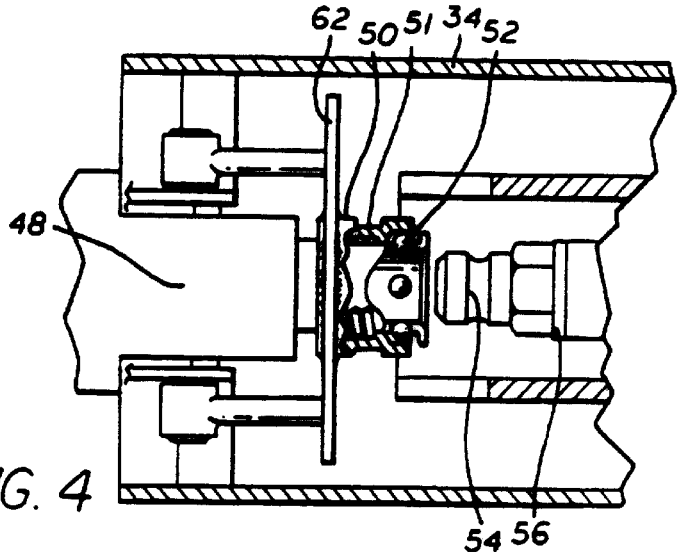
FIG. 4 is a cross-sectional view taken on line 4—4 of FIG. 3.
Figures 5, 7:
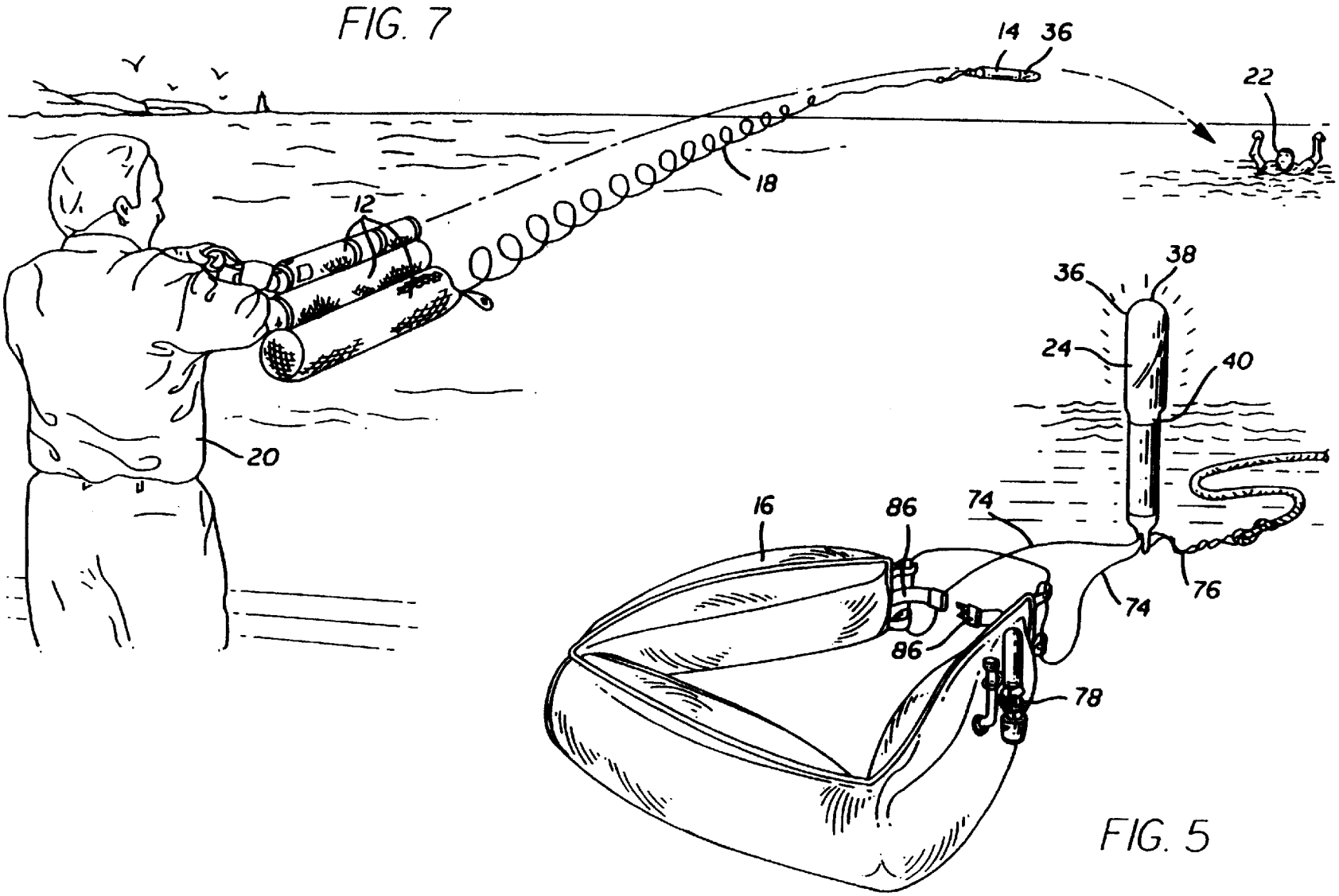
FIG. 5 is a perspective view of a flotation device which is part of the disclosed embodiment, in a deployed condition, the flotation device being shown in collapsed condition in FIG. 1 and FIG. 2.
FIG. 7 is a pictorial rendition of the rescue apparatus of FIG. 1 being deployed.

Referring now to the drawings, and particularly to FIG. 1, there is shown a self-propelled rescue apparatus 10 of the present invention. The rescue apparatus 10 includes a hand-held launcher 12 for a self-propelled missile 14 that carries a life-support item, such as an inflatable harness 16, with a flexible life-line 18 attached thereto, to a distressed target, such as a person who has fallen overboard from a boat. A typical rescue scenario is depicted in FIG. 7, where the missile 14 has been aimed and launched by a rescuer 20 to a person 22 in distress in the water a substantial distance away from the rescuer. The missile 14 delivers to the person 20 the flexible life-line 18, the inflatable harness 16, and a beacon 24. The apparatus of the invention is adapted so that the harness 16 is inflated and the beacon 24 illuminated automatically in response to water contact. A beacon that has been found to be satisfactory is model number L87 light weight beacon manufactured by ACR.

Figure 2:
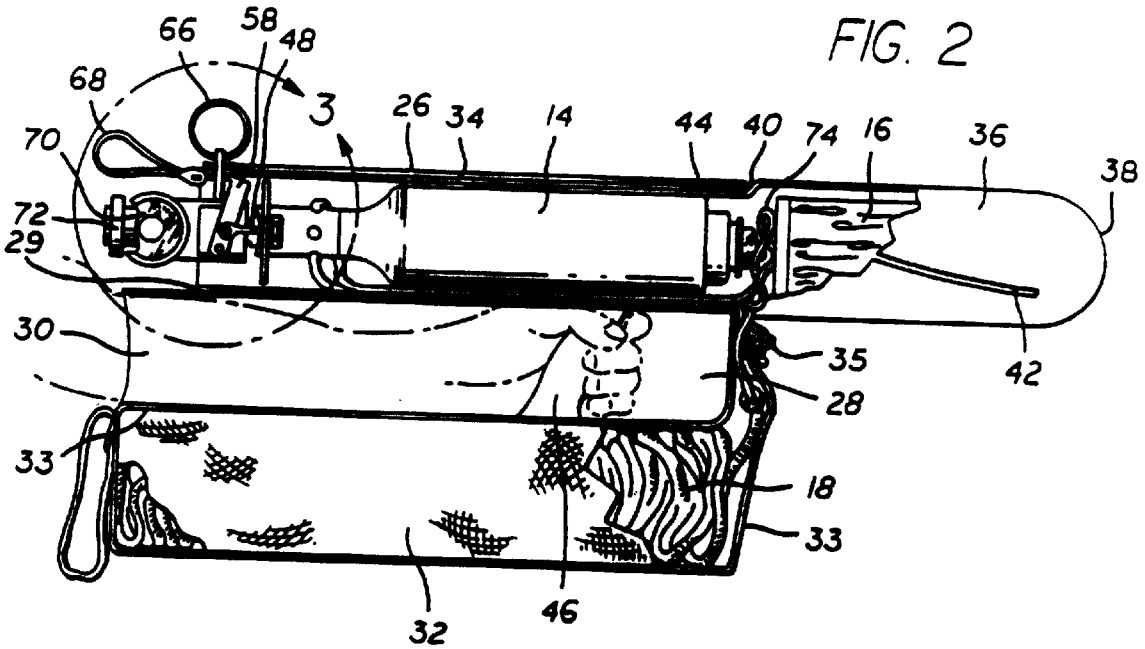
FIG. 2 is a cross-sectional view taken on line 2—2 of FIG. 1.

Referring now to FIGS. 1 and 2, the launcher 12 includes a cylindrical missile compartment 26 for housing the self-propelled missile 14, a body-engaging portion 28 attached longitudinally along the underside 29 of the missile compartment and 26 shaped to provide a sleeve for receiving an arm 30 of the rescuer 20. Another compartment 32 oriented longitudinally along an underside 33 of the body-engaging portion 28 contains the flexible line 18 in a coiled or spiral-wound configuration. For reasons of durability and light weight, as well as ease of manufacture, the launcher 12, including the portions forming the missile compartment, the 26 body-engaging portion 28, and the flexible line compartment 32, is made of canvas-like material.

The line 18 preferably is made from nylon or a similar material that is substantially unaffected by sea water, as well as strong enough to pull the weight of a large person. Further, compartment 32 includes a distal flap 33 releasably connected to the flexible line 18 via a half-ring pin and light line assembly 25, through which the flexible line 18 may exit without substantial resistance. Contained within the missile compartment 26 is a cylindrical tube 34, made of aluminum or another high strength lightweight material which is configured to protect and guide the self-propelled missile 14.

The launcher 12 also embodies a generally tube-shaped life-support container 36 having an enclosed end 38 with a hemispherical configuration and an open end 40 with a reduced diameter. The container 36 has a slit 42 running longitudinally in a curved pattern from the open end 40 toward the distal end 38. The open end 40 of the container 36 is configured to be inserted and held within a distal opening 44 in the cylindrical aluminum insert 34, so that the end of the container 36 points away from the rescuer 20. As shown in FIG. 2, the container 36 is configured to receive a collapsed inflatable harness 16.

Attached to the rescuer's end of the cylindrical tube 34 is a trigger mechanism 38 for launching the self-propelled missile 14. The trigger mechanism 48 includes a quick release valve assembly 50, which comprises a cylindrical housing with a valve split ring 51 having ball bearings 52 positioned in captured relation about its circumference. The assembly is biased toward the missile 14 and receives a nipple 54 on the proximal end 56 of a cartridge portion of the missile 14. An L-shaped trigger arm assembly 58 is attached at about a midpoint of one of its legs to a member 60 extending proximally from a plate 62 which engages a circumference of the quick-release valve assembly 50. Once end of the trigger arm assembly 58 is pivotally attached to a nozzle assembly 64 and another end is configured to receive the pin portion of a safety ring and end pin 66 as well as a trigger strap 68.

The nozzle assembly 64 further includes a pressure gauge 70 for monitoring and displaying pressure of the air contained within the missile 14 and a machined lip 72. Further, the nozzle assembly 64 has a hollow interior (shown) and an opening (not shown) in communication with the hollow interior and through which air may be caused to flow to the missile nozzle nipple 54 to fill the missile 14.

Attached to the collapsed inflatable harness 16 are a pair of lines 74 which secure the collapsed inflatable harness 16 to the missile 14. A third line 76 attached the flexible line 16 to the missile 14.

When so configured, the launcher 12 is ready for use. Referring to FIG. 2, the trigger mechanism 48 operates to retain the self-propelled missile 14 in place within the cylindrical missile tube 34, as well as to keep pressurized air within the missile 14. The safety ring and pin 66 insures that the missile 14 is so retained by locking the trigger mechanism 48, thereby preventing any unexpected or accidental launching of the missile 14. Moreover, in its fully charged state, it is contemplated that the self-propelled missile 14 be pressurized with air in the range of 2500 to 3000 psi. Further, as configured, the launcher 12 is evenly balanced fore and aft, thereby minimizing a heavy nose or tail effect when aiming the apparatus.

The rescue apparatus is adapted to be hand held, as shown in FIGS. 1, 2 and 7, for aiming and launch. To facilitate the process, the sleeve receives the rescuers arm and a hand grip 46 is provided.

Figure 3:
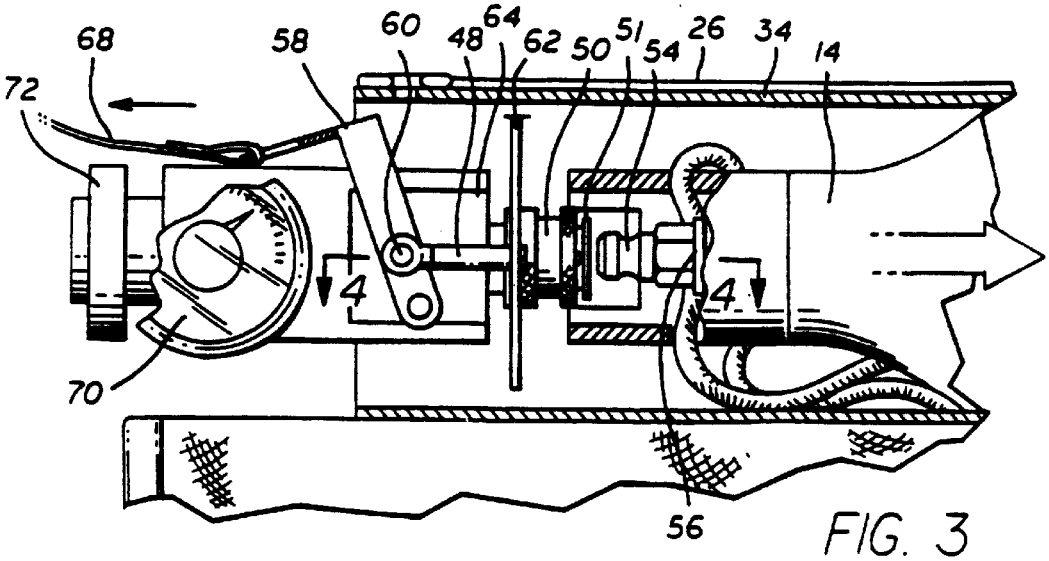
FIG. 3 is an enlarged, partial view taken within circle 3 of FIG. 2, depicting the apparatus of the invention immediately after initiation of a launch.

In order to deploy the self-propelled missile 14, the rescuer 20 removes the safety ring and pin 66 from engagement with the L-shaped trigger arm assembly 58. Referring now to FIG. 3, the rescuer next pulls on the trigger strap 68 which in turn causes the trigger arm assembly 58, through its connection with plate 62, to pull the distally biased quick-release valve split ring 51 from engagement with the nozzle nipple assembly 54. More specifically, when the trigger strap is pulled, the ball bearings 52 positioned about the circumference of the quick release assembly 50 are removed from engagement with the outer circumference of the nipple assembly 54. Once this has occurred, the pressurized air within the self-propelled missile is permitted to escape through the nipple assembly, thereby propelling the missile 14 out of the launcher and, thereafter, for an extended period toward the target. The cylindrical tube 34, in turn, acts as an initial launch tube and guides the missile trajectory.

Figure 6:
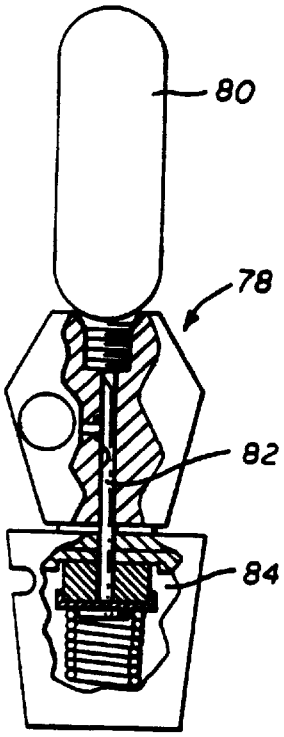
FIG. 6 is a partial cut-away view of the flotation device inflation mechanism.

Referring now to FIGS. 5 and 6, once the missile 14 has reached its destination and contacted the water, the inflatable harness 16 automatically inflates, ejecting itself out through slit 42 formed in the life-support container 36. That is, an automatic inflation apparatus 78 which is attached to the side of the inflatable harness 16 causes the harness to inflate. An automatic inflation mechanism that has been found to be particularly satisfactory is model V-80,000 EC-4 manufactured by Holkey-Roberts. The inflation apparatus 78 includes a standard $CO_2$ cartridge 80 and a spring-loaded cartridge piercing device 82 that is held in a "cocked" position by a water-soluble pellet 84 until it has been dissolved by water (two to three seconds). Once the pellet 84 dissolves, the piercing device 82 pierces the $CO_2$ cartridge 80, thereby allowing it to inflate the harness 16.

At the same time, the missile 14 and life-support container 36 with a beacon 24 (not shown) flashing inside, floats in the water near the victim 22. The victim would then put on the harness 16 and secure it around their chest and under their arms. To aid in securing the harness 16 to the victim 22 the harness 16 can be configured with straps 86 which can be tightened about the victim. Thereafter, the flexible line 18 can be attached to the front of the harness 16 to facilitate a rescue using the flexible line 18 to pull the victim 22 to safety. Once the victim has been rescued the entire self-propelled rescue apparatus 10 will also be retrieved and be available for repackaging for subsequent use.

Figure 8:
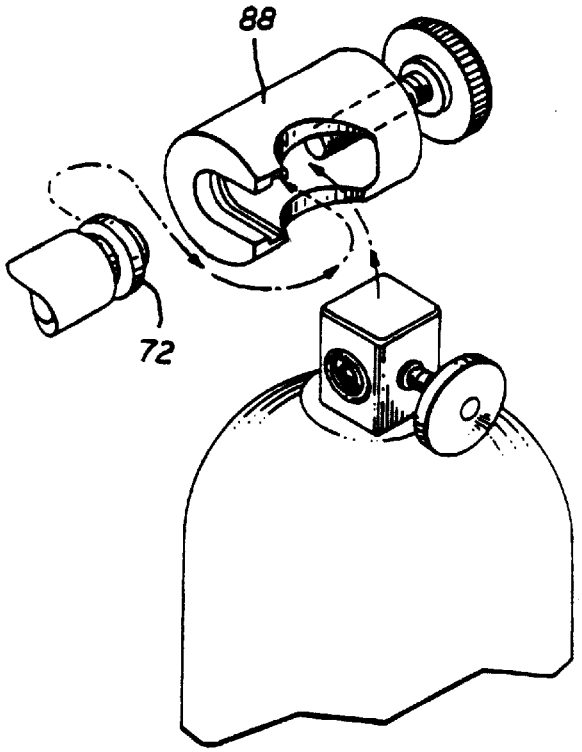
FIG. 8 is a partial cut-away perspective view of a missile recharging adapter depicting how it is affixed to the rescue apparatus and a standard compressed air tank for recharging purposes.

Recharging the missile 14 requires a specially designed adapter 88 (FIG. 8). This adapter is slotted and half-open on one side to allow it to be slipped over the machined lip 72 formed in the nozzle assembly 64. With this arrangement, the missile 14 is recharged while its installed in the rescue apparatus 10.

It is contemplated that the rescue apparatus will have uses other than water rescue. For example, the life support item might be as simple as a first aid item that is transferred between ships at sea or a handle for a victim stranded on a mountain cliff.

It will be apparent from the foregoing, while a particular form of the invention has been illustrated and described and certain modifications referenced, various other modifications can be made without departing from the spirit and scope of the invention. Accordingly, it is not intended that the invention be limited, except as by the appended claims.

I claim:

1. Rescue apparatus comprising:

a launcher with a body-engaging portion comprising an arm-receiving sleeve and a hand grip for use by a rescuer in aiming said launcher, *said hand grip adapted to be gripped by a first hand of the rescuer*;

a self-propelled missile releasably mounted on said launcher and adapted to be launched therefrom;

a life-support item carried by said missile and arranged to be deployed at a location remote from said launcher;

a flexible line having opposite ends and connected at one said end to said launcher and at the opposite said end to said life-support item; and a trigger actuateable to launch said missile and cause said life-support item to be carried by said missile to said remote location for deployment, *said trigger being remote from the first hand of the rescuer when said hand is gripping said hand grip*.

2. The rescue apparatus of claim 1, wherein said missile is charged with compressed air which serves as the missile propellant.

3. The rescue apparatus of claim 1, wherein said missile is connected to said line after said life-support item is deployed to enable said missile to be retrieved by said line, and wherein said missile is capable of being recharged for subsequent use.

4. The rescue apparatus of claim 1, wherein said life-support item comprises an inflatable flotation device carried by said missile in a collapsed, deflated condition and arranged to be deployed and inflated at said location remote from said launcher.

5. The rescue apparatus of claim 4, further including means responsive to contact with water for causing said flotation device to be inflated automatically.

6. The rescue apparatus of claim 1, wherein said line is initially supported in a coiled condition on said launcher and uncoils without substantial resistance as said missile carries said life-support items to said location remote from said launcher.

7. The rescue apparatus of claim 1, wherein compressed gas provides said self-propelled missile with sustained thrust substantially throughout its flight path.

8. Water rescue apparatus for supporting in the water and retrieving a person at a location remote from a rescuer, comprising:

a launcher at the location of the rescuer with a body-engaging portion comprising an arm-receiving sleeve and a hand grip for use by a rescuer in aiming said launcher;

a self-propelled missile releasably mounted on said launcher and adapted to be aimed toward the distressed person and launched from said launcher;

a flotation device for supporting the distressed person in the water and capable of being packaged in a collapsed condition in which it occupies a relatively small space and of being deployed to an uncollapsed condition for such supporting purpose;

a length of flexible line connected at its opposite ends to said launcher and to said flotation device;

means on said missile defining a compartment for carrying said flotation device in its collapsed condition and for releasing the same for deployment at said remote location; and means associated with said flotation device and activated by water contact for causing said flotation device to be ejected from said compartment and deployed.

9. The rescue apparatus of claim 8, wherein said missile includes a cartridge charged with compressed gas which serves as propellant for said missile.

10. The rescue apparatus of claim 9, wherein said missile is capable of being recharged with compressed gas for subsequent use.

11. The rescue apparatus of claim 8, further including a beacon carried by said missile, and water-activated means for causing said beacon to illuminate responsive to contact with water.

12. The rescue apparatus of claim 8, wherein said flotation device is an inflatable harness which is deflated in said collapsed condition and inflated in said expanded condition.

13. The rescue apparatus of claim 9, wherein said launcher is adapted to be hand-held for aiming and launching said missile.

14. The rescue apparatus of claim 8, wherein compressed gas provides said self-propelled missile with sustained thrust substantially throughout its flight path.

*15. The rescue apparatus of claim 8, wherein said launcher further includes a missile-receiving compartment generally parallel to said arm-receiving sleeve, wherein said missile is mounted at least partially within said missile-receiving compartment and more than one-half of a length of said missile-receiving compartment lies between a hand of the rescuer and the torso of the rescuer when the hand of the rescuer grips said hand grip.*

*16. The rescue apparatus of claim 8, further comprising a trigger actuateable to launch said missile, wherein said hand grip is gripped, in use, by a first hand of the rescuer, and said trigger is actuated by a second hand of the rescuer.*

*17. The rescue apparatus of claim 1, wherein approximately one-half of said missile lies between a hand of the rescuer and the torso of the rescuer when said missile is mounted on said launcher and the hand of the rescuer grips and said hand grip.*

*18. The rescue apparatus of claim 1, wherein said launcher further includes a missile-receiving compartment generally parallel to said arm-receiving sleeve, wherein said missile is mounted at least partially within said missile-receiving compartment and more than one-half of a length of said missile-receiving compartment lies between a hand of the rescuer and the torso of the rescuer when the hand of the rescuer grips said hand grip.*

*19. The rescue apparatus of claim 1, wherein an opposite end of said flexible line is connected to said launcher.*

*20. The rescue apparatus of claim 1, wherein said trigger is actuated by the second hand of the rescuer.*

*21. The rescue apparatus of claim 1, wherein said missile is mounted on said launcher in a generally empty state and is filled with compressed gas after being mounted.*

*22. Rescue apparatus comprising:*

*a launcher with a body-engaging portion comprising an arm-receiving sleeve and a hand grip for use by a rescuer in aiming said launcher;*

*a self-propelled missile releasably mounted on said launcher and launched therefrom, said missile being mounted on said launcher in a generally empty state and filled with compressed gas after being mounted; and*

*a trigger actuateable to launch said missile to a location remote from said launcher.*

*23. The rescue apparatus of claim 22, wherein approximately one-half of said missile lies between a hand of the*

*rescuer and the torso of the rescuer when said missile is mounted on said launcher and the hand of the rescuer grips said hand grip.*

*24. The rescue apparatus of claim 22, wherein said launcher further includes a missile-receiving compartment generally parallel to said arm-receiving sleeve, wherein said missile is mounted at least partially within said missile-receiving compartment and more than one-half of a length of said missile-receiving compartment lies between a hand of the rescuer and the torso of the rescuer when the hand of the rescuer grips said hand grip.*

*25. The rescue apparatus of claim 22, further comprising:*

*a flexible line having opposite ends, and one said end being carried by said missile to the location remote from said launcher.*

*26. The rescue apparatus of claim 22, further comprising:*

*a life-support item carried by said missile to the location remote from said launcher.*

*27. The rescue apparatus of claim 26, further comprising:*

*a flexible line having opposite ends and connected at one said end to said life-support item.*

*28. The rescue apparatus of claim 23, wherein said missile is charged with compressed air which serves as propellant for said missile.*

*29. The rescue apparatus of claim 22, wherein compressed gas provides said self-propelled missile with sustained thrust substantially throughout its flight path.*

*30. The rescue apparatus of claim 22, wherein at least a portion of said missile is adjacent to a forearm of the rescuer when said missile is mounted on said launcher and the forearm is received in said arm-receiving sleeve.*

*31. The rescue apparatus 22, wherein a first hand of the rescuer grasps said hand grip, and a second hand actuates said trigger.*

* * * * *